Oct. 11, 1949.  J. RAZEK  2,484,736
APPARATUS FOR DETERMINING THERMAL CONDUCTIVITY
Filed May 19, 1945  2 Sheets-Sheet 1
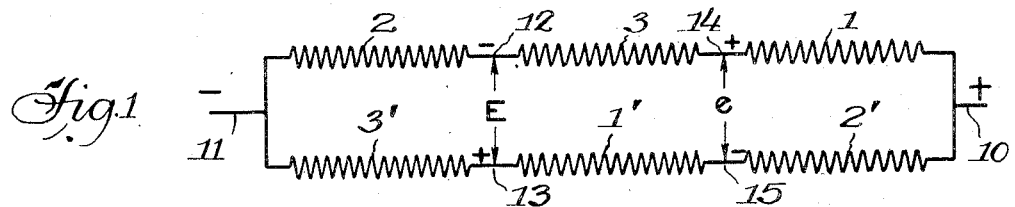
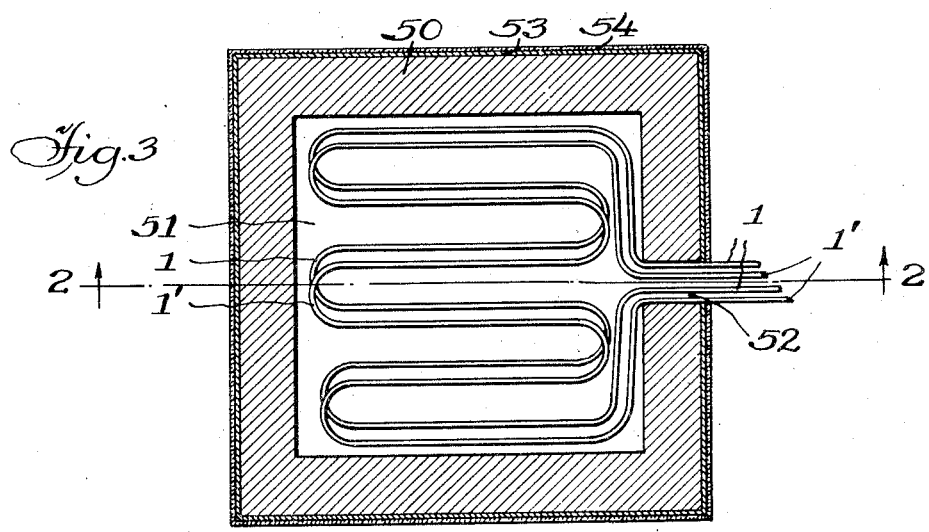
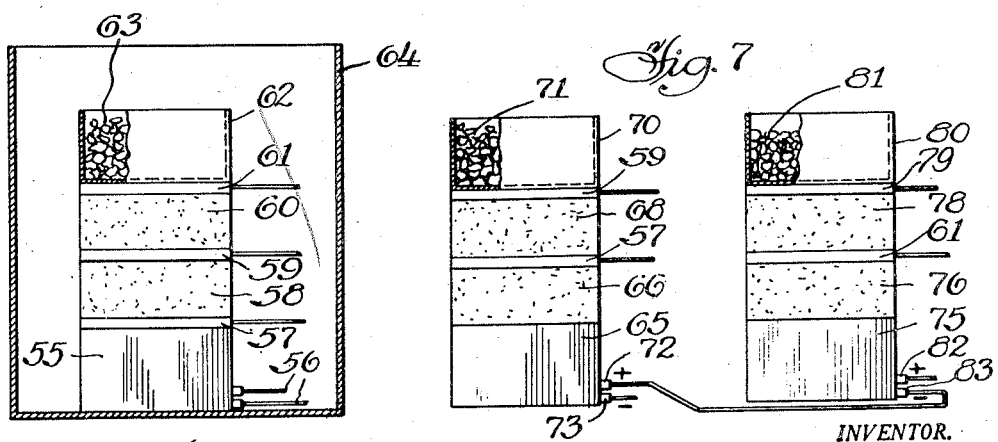
INVENTOR.
Joseph Razek
BY Tesch and Darbo
Attys.

Oct. 11, 1949.   J. RAZEK   2,484,736
APPARATUS FOR DETERMINING THERMAL CONDUCTIVITY
Filed May 19, 1945   2 Sheets-Sheet 2
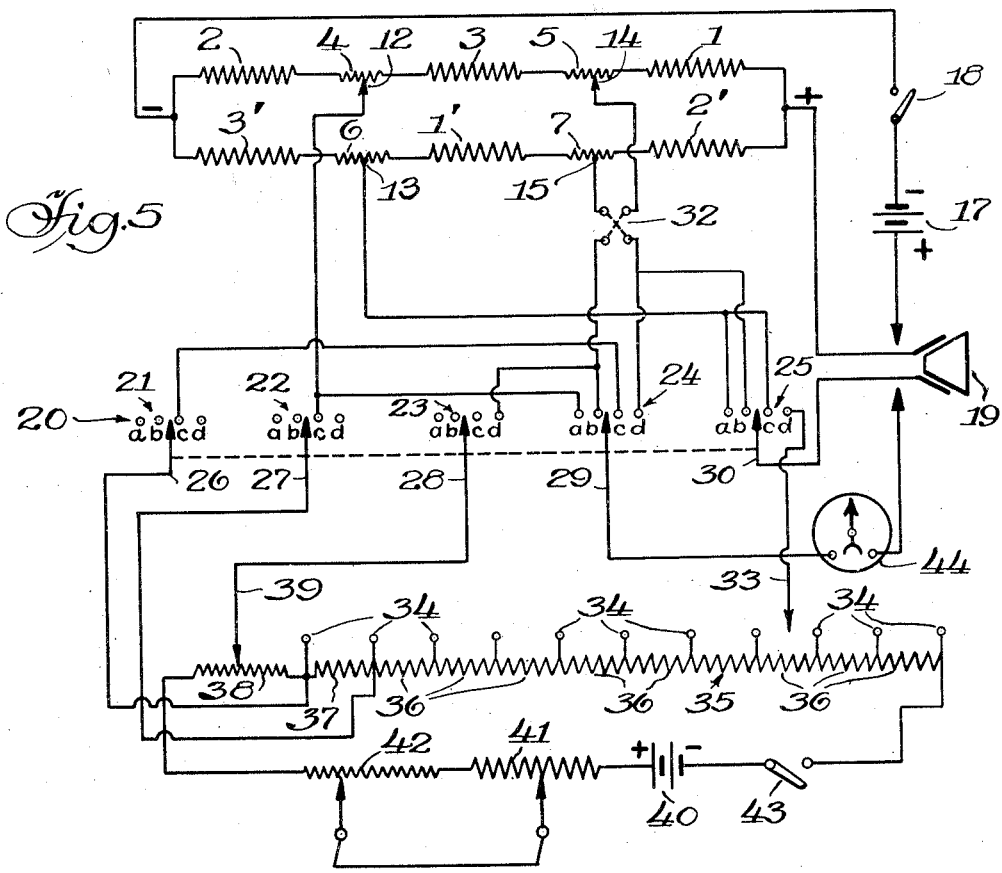
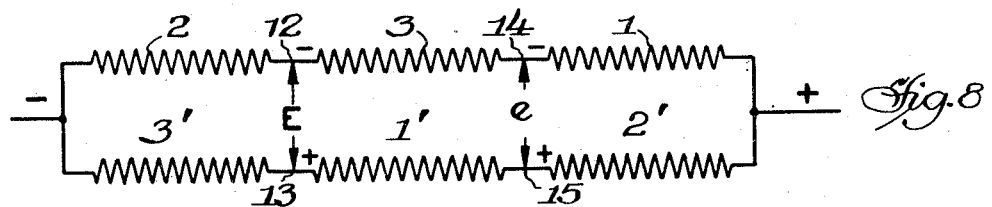
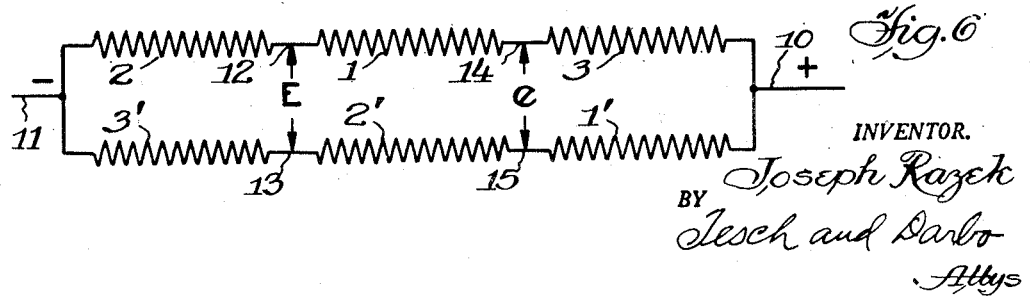
INVENTOR.
Joseph Razek
BY
Tesch and Darby
Attys Patented Oct. 11, 1949

2,484,736

UNITED STATES PATENT OFFICE 2,484,736

APPARATUS FOR DETERMINING THERMAL CONDUCTIVITY

Joseph Razek, Llanerch, Pa., assignor, by mesne assignments, to Oliver W. Storey, Wheaton, Ill., as trustee for the partnership of O. W. Storey & Associates, Chicago, Ill.

Application May 19, 1945, Serial No. 594,661

15 Claims. (Cl. 73—15)

This invention relates to an apparatus and method for determining the thermal conductivity of materials, and it is the primary object of the invention to provide an improved apparatus which is simple and economical and which gives a direct reading of the thermal conductivity of the tested specimen of material.

It is a further object of the invention to provide an apparatus in which the thermal conductivity of a material is determined by comparison with the known thermal conductivity of a different material which is used as a standard.

It is a specific object of the invention to provide an apparatus in which resistors having high temperature coefficients of resistance are arranged at different temperatures depending on the thermal conductivity of the material, and such thermal conductivity is determined from the resistance values of the resistors at such temperatures.

Other objects and advantages will become apparent as the following description progresses, which is to be taken in connection with the accompanying drawings, in which:

Fig. 1 is a diagrammatic illustration of an electrical arrangement of the resistors in accordance with the invention;

Fig. 2 is a sectional view along line 2—2 of Fig. 3, showing a resistor unit employed in the apparatus;

Fig. 3 is a sectional view along line 3—3 of Fig. 2;

Fig. 4 is an elevational view, with a portion shown in section, of a physical arrangement of the apparatus showing the materials being tested;

Fig. 5 is a diagrammatic illustration of the electrical portion of the apparatus;

Fig. 6 is a diagrammatic illustration of a modification of the resistor arrangement;

Fig. 7 is an elevational view of an alternative arrangement of the apparatus showing the material being tested; and Fig. 8 is a diagrammatic representation of the electrical arrangement of the resistors employed with the apparatus arrangement shown in Fig. 7.

In accordance with the invention, the thermal conductivity of a material is determined by comparison with that of a standard material, the thermal conductivity of which is known. When a slab of material has its two surfaces at different temperatures, heat will flow through the slab from one surface to the other in accordance with the following formula:

$$H = \frac{KAT(t_3-t_1)}{x} \quad (1)$$

where H is the amount of heat, K is the thermal coefficient of thermal conductivity of the material, A is the area and $x$ is the thickness of the material, T is the time, $t_3$ is the temperature at one surface and $t_1$ is the temperature at the other surface of the material, $t_3$ being the higher temperature.

If two slabs of material having the same shape and area are placed in thermal contact with each other and the exposed surface of the first subjected to the higher temperature $t_3$ and the exposed surface of the second subjected to the lower temperature $t_1$, and if there is no heat lost at the edges of the slabs, the amount of heat flowing through both of the slabs is the same and an intermediate temperature $t_2$ is established between the slabs. If the first slab has a coefficient of thermal conductivity $K_u$ which is unknown and the second has a coefficient $K_s$ which is known, the following equations represent the heat conducted by the different slabs:

$$H = \frac{K_u A T(t_3-t_2)}{x_u} \quad (2)$$

$$H = \frac{K_s A T(t_2-t_1)}{x_s} \quad (3)$$

from which it follows that $$\frac{K_u}{x_u} = \frac{H}{AT} \times \frac{1}{t_3-t_2} \quad (4)$$

$$\frac{K_s}{x_s} = \frac{H}{AT} \times \frac{1}{t_2-t_1} \quad (5)$$

Since $$\frac{K_s}{x_s} \text{ and } \frac{K_u}{x_u}$$

are simply the heat conductivities of the two materials for their given thicknesses, from which the coefficients of thermal conductivity $K_s$ and $K_u$ can readily be determined, for convenience the terms $k_s$ and $k_u$ may be substituted for the terms $$\frac{K_s}{x_s} \text{ and } \frac{K_u}{x_u}$$

respectively. Dividing Equation 4 by Equation 5 produces the following relationship:

$$\frac{k_u}{k_s} = \frac{t_2-t_1}{t_3-t_2} \qquad (6)$$

In accordance with the invention, resistors having a high temperature coefficient of resistance are placed at each of the three locations of temperatures $t_3$, $t_2$ and $t_1$. The resistors may be composed, for example, of nickel wire and are so constructed that their resistances at 0° C. and their temperature coefficients of resistances designated by $a$, are identical. Their resistance values at each of the three temperatures are as follows:

$$R_1 = R_0(1+at_1) = R_0 + R_0 at_1 \qquad (7)$$
$$R_2 = R_0(1+at_2) = R_0 + R_0 at_2 \qquad (8)$$
$$R_3 = R_0(1+at_3) = R_0 + R_0 at_3 \qquad (9)$$

Substracting Equation 8 from Equation 9, produces the following result:

$$R_3 - R_2 = R_0 a(t_3 - t_2) \qquad (10)$$

and substracting Equation 7 from Equation 8 produces the following:

$$R_2 - R_1 = R_0 a(t_2 - t_1) \qquad (11)$$

from which the following results:

$$\frac{R_2-R_1}{R_3-R_2} = \frac{t_2-t_1}{t_3-t_2} \qquad (12)$$

and $$\frac{k_u}{k_s} = \frac{R_2-R_1}{R_3-R_2} \qquad (13)$$

The direct determination of the values of resistances $R_1$, $R_2$, and $R_3$ is difficult, and in accordance with the invention, these values are converted into values of potential difference, which are measured by connecting measurable potential differences in opposition to them and determining the potential differences required to neutralize them. This is accomplished by causing the same current to flow through all of the resistors, whereby the potential drop across each resistor is proportional to its resistance value. Instead of a single resistor being arranged at each temperature location, two resistors are so located, that is, each resistor is accompanied by a second resistor, all of the resistors being identical and having the same resistance value at a given temperature. In practice, resistor units each containing two resistors are employed, as will be described hereinafter. The resistors located at temperature $t_1$ have the resistance value $R_1$ and are designated by the numerals 1 and 1'. The others are designated in a corresponding manner. They are arranged electrically into two groups of three resistors, the resistors of each group being connected in series with a source of voltage, and the two groups being connected in parallel with each other, as shown in Fig. 1. One of the groups consists of resistors 1, 2, and 3 and the other of resistors 1', 2' and 3'. In this figure, conductors 10 and 11 lead to a suitable source of electrical energy, conductor 10 being at a potential which is positive with respect to that of conductor 11. Proceeding from conductor 10 along one group, the resistors are arranged in the order 1, 3 and 2, and proceeding in the same direction along the other group, they are arranged in the order 2', 1' and 3'. The total resistance of each group is the same so that equal values of current flow through all the resistors. Designating this value of current as $i$, and designating the various inter-resistor points as 12, 13, 14 and 15, as shown in Fig. 1, and designating the potential difference between the points 12 and 13 as $E$ and the potential difference between points 14 and 15 as $e$, the following relationships exist:

$$E = iR_3' - iR_2$$
$$e = iR_2' - iR_1$$

and since $R_3 = R_3'$ and $R_2 = R_2'$, the following equations may be written:

$$E = iR_3 - iR_2 = i(R_3 - R_2) \qquad (14)$$
$$e = iR_2 - iR_1 = i(R_2 - R_1) \qquad (15)$$

with the potential at the point 13 being positive with respect to that at the point 12 and the potential at the point 14 being positive with respect to that at the point 15, as indicated in Fig. 1. Continuing the analysis, since the same value of current flows in both groups, $$\frac{e}{E} = \frac{R_2-R_1}{R_3-R_2} = \frac{k_u}{k_s} \qquad (16)$$

Therefore, the ratio of the thermal conductivity of the unknown material to that of the known or standard material equals the ratio of the potential difference between the points 14 and 15 to that between the points 12 and 13.

One of the resistor units, such as the one containing resistors 1 and 1', is illustrated in Figs. 2 and 3. The unit consists essentially of a thin flat plate of highly heat-conductive material having a shallow cavity within which two resistance wires are contained. The plate-form element is composed of a substantially closed ring 50 of a highly heat-conductive material, such as copper, having a cavity 51 therein. Said ring is shown as being rectangular in shape, but it may be of any desired shape, such as annular. One of the legs of the ring has an opening 52 therein leading to the cavity 51. Two insulated resistance wires 1 and 1' pass into cavity 51 through opening 52 and are folded back and forth across the area of the cavity 51 and then lead out again through opening 52. The ring 50 and cavity 51 are enclosed by a shell 53 of thin highly heat-conductive sheet material, such as copper, said shell having an opening coinciding with opening 52 for the passage of wires 1 and 1'. The edges of the unit preferably have thereon an exterior layer 54 of a material having a low coefficient of heat conductivity, such as rubber, synthetic resin, or the like, and the exposed surface of layer 54 may be painted or otherwise treated to give it a low heat radiating property. While the unit may be of any desired dimensions, in a specific example it was 4 inches square and $\frac{1}{32}$ inch thick. The unit is quite sensitive to ambient temperature and the interior of cavity 51 and the wires 1 and 1' follow very quickly any changes in such temperature.

The arrangement of the specimens of material and resistor units between the surfaces at different temperatures is shown in Fig. 4. An electrically energized heater 55 is connected to a suitable source of electric energy by the conductors 56. The heater 55 has a flat top heating surface and the elements are arranged in a stack on such surface in heat-conductive contact with each other and said surface. Proceeding upwardly from the heater 55, the elements consist of the resistor unit 57, similar to the unit illustrated in Figs. 2 and 3, the slab 58 of the standard material, the coefficient of thermal conductivity of which is known, a second resistor unit 59, a slab 60 of material the thermal conductivity of which it is desired to determine, a third resistor unit 61, and a container 62 composed of a highly heat-conductive material, such as copper, which is filled with a material 63 which remains at a substantially constant temperature, for example, ice. In this arrangement, resistor unit 57 contains resistors 3 and 3', unit 59 contains resistors 2 and 2', and unit 61 contains resistors 1 and 1'. The contacting surfaces of the several elements are of the same shape and size and coincide with each other. Walls 64 having low heat absorptivity are preferably arranged in opposed relation to the edges of the elements, to reduce loss of heat from the edges of the elements.

In conducting a test, the heater 55 is energized and the top surface thereof comes to an equilibrium temperature within a short time. The source of electrical energy should supply a substantially steady voltage, so that the equilibrium temperature is maintained constant. Resistor unit 57 reaches the same temperature at approximately the same time or shortly thereafter. This is temperature $t_3$. In the same way, the resistor unit 61 reaches an equilibrium temperature of 0° C., the temperature of the ice 63. This temperature is $t_1$. The resistor unit 59 reaches an equilibrium temperature at a later moment, this temperature being $t_2$. The resistor units are so thin and have such a high coefficient of thermal conductivity that there is no substantial difference between the temperatures at their opposite surfaces, and any slight difference as may exist can be ignored without impairing the satisfactory accuracy of the determinations.

The resistors are connected into the circuit arrangement shown in Fig. 5. The groups of resistors 1, 2, 3 and 1', 2', 3' are connected in parallel with each other and each is connected in series with a suitable source of energy, such as battery 17, a switch 18 and a push button switch 19 to form an arrangement similar to that described in connection with Fig. 1. A variable resistor 4 is connected in series between resistors 2 and 3 and a second variable resistor 5 is connected in series between resistors 3 and 1. In a similar way, fixed resistors 6 and 7 are connected in series respectively between resistors 3' and 1' and between resistors 1' and 2'. Resistors 4, 5, 6 and 7 have resistances of relatively small value in comparison with the resistance values of resistors 1, 2, 3 and 1', 2' and 3' and the sum of the resistance values of resistors 4 and 5 is equal to the sum of the resistance values of resistors 6 and 7. A gang-operated selector switch, designated generally by the numeral 20, has 5 sets of 4 contacts each, the sets being designated respectively by the numerals 21, 22, 23, 24 and 25 and the corresponding contacts of each set being designated by the letters a, b, c and d, respectively. Each set of contacts is adapted to cooperate with one of the 5 movable contacts 26, 27, 28, 29 and 30.

In selector switch 20, contact c of set 21 is connected to contact c of set 24. Contact c of set 22 and contact a of set 24 are connected to an intermediate point on variable resistor 4. Contact d of set 23 and contact b of set 24 are connected to one terminal of a reversing switch 32 and contact d of set 24 and contact b of set 25 are connected to another terminal of said switch 32, the cooperating terminals of said switch being connected respectively to intermediate points on fixed resistor 7 and variable resistor 5. Contacts a and c of set 25 are connected to an intermediate point on fixed resistor 6. Contact d of set 25 is connected to movable contact member 33 which is adapted to make selective contact with the several terminals 34 of a tapped potentiometer 35.

The potentiometer 35 is divided into a number of equal sections. In the specific potentiometer illustrated, there are eleven equal sections, the first nine of which are designated by the numeral 36 and the last two of which are designated by the numerals 37 and 38, respectively. The ends of sections 36 and 37 are connected respectively to the tap terminals 34, and section 38 has a movable contact 39. A voltage is supplied to potentiometer 35 by a suitable source of energy, such as battery 40, and two variable resistors 41 and 42 and a switch 43 are connected in series between the potentiometer 35 and battery 40, resistor 41 being adapted for coarse adjustment and resistor 42 for fine adjustment.

The movable contacts 26 and 27 of selector switch 20 are connected respectively to the tap terminals 34 at the opposite ends of section 37 of potentiometer 35. The movable contact 28 of said selector switch is connected to the movable contact 39 of adjustable section 38 of potentiometer 35. The movable contact 29 of said selector switch is connected to one terminal of a galvanometer 44, the other terminal of which is connected through push button switch 19 to the movable contact 30 of selector switch 20. Push button switch 19, upon operation, closes both the circuit leading to battery 17 and that leading to galvanometer 44.

In the operation of the apparatus of Fig. 5, it is first determined that the points 12 and 13 are at the same potential in the cold, that is, when all of the resistors are at room temperature and before the heater 55 is energized. The same is also determined for the points 14 and 15. The apparatus is placed in operation by closing switches 18 and 43 and the movable contacts 26, 27, 28, 29 and 30 of the selector switch 20 are moved to position a, that is, in contact with the contacts a of the various sets of contacts of said selector switch. Push button switch 19 is then closed and the movable contact of resistor 4 and the fixed contact of resistor 6 are thereby connected together through the galvanometer 44. Variable resistor 4 is adjusted until the galvanometer reading becomes zero and push button switch 19 is opened. It is thereby insured that points 12 and 13 are at the same potential and the effective resistance values of resistors 2 and 3' are the same.

The reversing switch 32 is adjusted to the reverse connected position in which resistor 5 is connected to contact b of set 24 and contact d of set 23 of selector switch 20 and resistor 7 is connected to contact d of set 24 and contact b of set 25. The movable contacts of selector switch 20 are then moved to position b, in which condition variable resistor 5 and fixed resistor 7 are connected together through the galvanometer 44 and push button switch 19. The push button switch is closed and resistor 5 is adjusted until the galvanometer reading becomes zero. This insures that points 14 and 15 are at the same potential.

The heater 55 is next energized and the temperature conditions of the apparatus are allowed to come to equilibrium. The movable contacts of selector switch 20 are then moved to position c, in which section 37 of potentiometer 35 and galvanometer 44 are connected in series between points 12 and 13, the arrangement being such that the voltage impressed by the potentiometer upon points 12 and 13 opposes that impressed upon said points by battery 17. Push button switch 19 is then closed and resistors 41 and 42 are adjusted until galvanometer 44 reads zero. Under such condition the potential difference across section 37 equals the potential difference between points 12 and 13, which is represented by E in Equation 16. It is unnecessary at this time to take any reading.

Push button switch 19 is then opened and the movable contacts of selector switch 20 are moved to position $d$, in which the portion of potentiometer 35 between movable contacts 33 and 39 is connected in series with galvanometer 44 between points 14 and 15, in such manner that the potential difference impressed by the potentiometer between points 14 and 15 opposes that impressed between said points by battery 17. Push button switch 19 is again closed for a short time while contacts 33 and 39 are adjusted until potentiometer 44 reads zero. Under such condition, the potential difference between contacts 33 and 39 equals the potential difference between points 14 and 15, which is $e$ in Equation 16. The ratio of the potential difference between points 14 and 15 to that between points 12 and 13 is, therefore, the same as the ratio of the potential difference between contacts 33 and 39 of potentiometer 35 when selector switch 20 is in position $d$ to the potential difference across section 37 of said potentiometer when switch 20 is in position $c$. In practice, contacts 33 and 39 are mounted upon dials and indicia are employed indicating each of the sections 36 and 37 as one unit and dividing the section 38 into ten equal portions. The potential difference between points 12 and 13 may, therefore, be considered as one unit, and the potential difference between points 14 and 15 is given directly by the reading upon the dials, as the value of $e$ in units and tenths. This is also the ratio $e/E$. In accordance with Equation 16, this ratio is the ratio of the thermal conductivity of the slab of unknown material to that of the known or standard material, for the actual thicknesses of slabs used. From this, it is a simple matter to obtain the coefficient of thermal conductivity for the unknown material by simply applying the proper thickness factor.

In the mechanical arrangement of Fig. 4, the positions of the slab 58 of standard material and slab 60 of unknown material may be reversed from those shown, and the results of the procedure will be the same, except that Equation 16 is reversed, that is, $$\frac{k_s}{k_u} = \frac{e}{E}$$

and the ratio which is obtained is that of the thermal conductivity of the standard material to that of the unknown material.

The electrical arrangement of the resistors may also be as is shown in Fig. 6, in which resistors 2 and 3' are in corresponding positions at one end of the groups and resistors 3 and 1' are in corresponding positions at the other end of the groups. In such arrangement, the following relationships are true:

$$e = iR_3 - iR_1 \quad (17)$$
$$E = iR_3 - iR_2 \quad (18)$$
$$e - E = iR_2 - iR_1 \quad (19)$$

The values of $E$ and $e$ can be determined by the same procedure as has been outlined heretofore and from these the value of $e-E$ can be determined and substituted for the value of $e$ in Equations 15 and 16, and from the latter the value of $$\frac{k_u}{k_s}$$

can be determined. For the purpose of the invention, therefore, it is only necessary that each resistor of one group be at a different temperature from the resistor in the corresponding position in the other group. The arrangement shown in Fig. 6 is not as advantageous as that shown in Fig. 1 because the value representing $e$ which is read upon the potentiometer 35 is not a direct reading of the value $$\frac{k_u}{k_s}$$

as it is when the arrangement shown in Fig. 1 is used, but a computation is required as described above.

In the electrical arrangement of the resistors, as shown in Fig. 1 or Fig. 6, additional resistors may be included between the end resistors of the groups as long as an equal amount of resistance is added to each group.

In the alternative arrangement illustrated in Fig. 7, two stacks of elements are employed instead of the single stack shown in Fig. 4. The stacks comprise the two heaters 65 and 75 which, upon being supplied with the same value of energizing current, are adapted to produce the same temperature at their top surfaces. One terminal 82 of the heater 75 is connected to a suitable source of electrical energy and the other terminal 83 is connected to one terminal 72 of the heater 65. The other terminal 73 of heater 65 is connected to the source of energy, whereby the heaters are connected in series and the same value of current flows through both, and the heating effects are equal.

For convenience, the same resistor units 57, 59 and 61 as described heretofore are employed in this alternative arrangement since they can be incorporated in the electrical arrangement of Fig. 5 without change. Proceeding upwardly from heater 65, and in thermal contact with each other, are arranged in succession the slab 66 of standard material, the thermal conductivity of which is known, the resistor unit 57, the slab 68 of unknown material, the resistor unit 59 and the container 70, similar to container 62, containing a material 71 for maintaining a constant temperature, such as ice.

In the same manner, there are arranged upon heater 75, in succession, the slab 76 of unknown material, resistor unit 61, the slab 78 of standard material, a resistor unit 79 which is not connected in the electrical circuit and therefore serves only as a plate having the same dimensions and thermal conductivity as one of the resistor units, and finally the container 80 of highly heat-conductive material, containing a material 81, such as ice, adapted to maintain the same temperature as does the material 71 in container 70. In this arrangement, all of the elements are of the same horizontal size and shape and their contacting surfaces coincide. In addition, the two standard elements 66 and 78 are identical in dimensions and composition, and the same is true of the two slabs of unknown material 68 and 76.

The temperature at the surfaces of heaters 65 and 75 is designated as $t_3$, that at the bottom surfaces of container 70 and 80 as $t_1$, and the temperature of resistor element 57 as $t_2$ and that of resistor element 61 as $t_2'$. The total amount of heat insulation between heater 65 and container 70 is the same as that between heater 75 and container 80 and the amount of heat conducted from heater 65 to container 70 is the same as that conducted from heater 75 to container 80. Therefore, the following relationships are true:

$$H = k_u AT(t_2 - t_1) = k_s AT(t_{2'} - t_1) \quad (20)$$

and $$k_u(t_2 - t_1) = k_s(t_{2'} - t_1) \quad (21)$$

and $$\frac{k_u}{k_s} = \frac{t_{2'} - t_1}{t_2 - t_1} \quad (22)$$

For convenience, the resistance values of resistors 3 and 3', contained in resistor unit 57 (at temperature $t_2$) will again be designated as $R_3$, those of resistors 2 and 2' of resistor unit 59 (at temperature $t_1$) as $R_2$ and those of resistors 1 and 1' of resistor unit 61 (at temperature $t_{2'}$) as $R_1$. Following computations similar to those from Equation 6 to Equation 13 produces the following result:

$$\frac{k_u}{k_s} = \frac{-(R_2 - R_1)}{R_3 - R_2} \quad (23)$$

and following computations similar to those from Equation 13 to Equation 16 produces the following result:

$$\frac{k_u}{k_s} = \frac{-e}{E} \quad (24)$$

The value $e$, which represents the potential difference between the points 14 and 15, is a negative quantity in Equation 24. This is due to the fact that point 14, instead of being at a higher potential with respect to point 15, as shown in Fig. 1, is at a lower potential. This condition is indicated in Fig. 8.

The foregoing shows that the same circuit arrangement and resistor units may be used in the two heater apparatus illustrated in Fig. 7 as in the single heater apparatus illustrated in Fig. 4, the ratio of the thermal conductivity of the unknown material to that of the standard material being determined by determining the ratio of the potential difference between points 14 and 15 to that between the points 12 and 13 as described in connection with the apparatus illustrated in Fig. 5.

The reversed polarity with respect to the potential difference between points 14 and 15 is taken care of by the reversing switch 32. When using the double heater apparatus, the switch is moved to the direct connected position in which variable resistor 5 is connected to contact $d$ of set 24 and contact $b$ of set 25 of selector switch 20 and fixed resistor 7 is connected to contact $b$ of set 24 and contact $d$ of set 23. The manipulation of the apparatus is the same as described heretofore in connection with the single heater equipment.

In the double stack apparatus of Fig. 7, the position of the slabs of standard and unknown materials may be reversed from the positions shown. If the positions of those associated with heater 65 are reversed, the positions of those associated with heater 75 must be reversed also. If such an arrangement is employed, Equation 24 is reversed, that is, $$\frac{k_s}{k_u} = \frac{-e}{E}$$

In this apparatus, also, a single heater and a single container may be used in place of the two heaters 65 and 75 and the two containers 70 and 80, and the two stacks of elements may be arranged between said surfaces, in separated relation to each other. In the double stack apparatus, the alternative electrical arrangement of the resistors shown in Fig. 6 may also be used, in which case the thermal conductivity is determined in the same manner as described heretofore in connection with such arrangement. In the double stack arrangement, the resistor unit 19 may be connected in the circuit, in which case one or both of the resistors thereof may be connected in the location of one or both of the resistors 2 and 2' in the circuit shown in Fig. 8 in place of one or both of the resistors of unit 59.

The two stack arrangement has the advantage that the loss of heat from the edges of the elements does not introduce any serious error, because the loss from one stack is substantially the same as that from the other, and the effects of the losses compensate for each other. The apparatus should be guarded against currents of air which would have any appreciable ventilating effect because then the loss of heat from the edges of the slabs would become uneven and would impair the accuracy of the results. In practice it has been found that the apparatus gives highly accurate results except where the thermal conductivity of the unknown material is considerably different from that of the standard material. The latter factor is not a serious disadvantage since standard materials can be chosen which are generally similar to the unknown material in which case results are obtained which are well within the required limits of accuracy. The apparatus of the invention presents a simple and economical means and method for quickly determining the thermal conductivity of materials and has a wide field of application. While it has been described as being adapted for determining the thermal conductivity of a material by comparison with a standard, the thermal conductivity of which is known, it is adapted as well for the comparison of the thermal conductivities of two materials, the thermal conductivity of neither of which is known.

What is claimed is:

1. Apparatus for determining the comparative thermal conductivities of specimens of two materials, comprising, in combination, means for providing two surfaces at different temperatures respectively, a plurality of resistors having substantially equal values of resistance at the same temperature and having substantially equal temperature coefficients of resistance, said resistors being arranged in three pairs, the resistors of each pair being so arranged that they are at substantially the same temperature, said specimens and said resistors being adapted to be arranged between said two surfaces in heat-conductive contact with each other and said surfaces with one of said pairs of resistors in contact with one of said surfaces, another pair of said resistors in contact with the other of said surfaces and the third pair of resistors between said specimens, said resistors being connected together in two groups, each group comprising one of the resistors of each of said pairs of resistors, the resistors of each group being connected together in series with each other, said groups of series-connected resistors being connected in parallel with each other to a source of electrical energy the two resistors located at the end positions in one of said groups of resistors being arranged respectively on opposite sides of one of said specimens and the two resistors located at the end positions in the other of said groups of resistors being arranged respectively on opposite sides of the other specimen, and the two resistors located at corresponding end positions at one end of said groups being arranged respectively on opposite sides of one of said specimens and the two resistors located at corresponding end positions at the other end of said groups being arranged respectively on opposite sides of the other specimen, and means for indicating the values, relative to each other, of the potential differences between corresponding inter-resistor points in the separate groups of resistors.

2. Apparatus for determining the comparative thermal conductivities of specimens of two materials, comprising, in combination, means for providing two surfaces at different temperatures respectively, a plurality of resistors having substantially equal values of resistance at the same temperature and having substantially equal temperature coefficients of resistance, said resistors being arranged in three pairs, the resistors of each pair being so arranged that they are at substantially the same temperature, said specimens and said resistors being adapted to be arranged between said two surfaces in heat-conductive contact with each other and said surfaces in the following order: a surface; a resistor pair; a specimen; a resistor pair; a specimen; a resistor pair; a surface, said resistors being connected together in two groups, each group comprising one of the resistors of each of said pairs of resistors, the resistors of each group being connected together in series with each other, said groups of series-connected resistors being connected in parallel with each other to a source of electrical energy, the two resistors arranged at corresponding end positions at one end of said groups being located respectively adjacent to opposite surfaces of one of said specimens, and the two resistors arranged at corresponding end positions at the other end of said groups respectively being located physically adjacent to opposite surfaces of the other of said specimens, and means for indicating the values, relative to each other, of the potential differences between corresponding inter-resistor points in the separate groups of resistors.

3. Apparatus for determining the comparative thermal conductivities of specimens of two materials, comprising, in combination, means for providing two surfaces at different temperatures respectively, a plurality of resistors having substantially equal values of resistance at the same temperature and having substantially equal temperature coefficients of resistance, said resistors being arranged in three pairs, the resistors of each pair being so arranged that they are at substantially the same temperature, said specimens and said resistors being adapted to be arranged between said two surfaces in heat-conductive contact with each other and said surfaces with one of said pairs of resistors in contact with one of said surfaces, another pair of said resistors in contact with the other of said surfaces and the third pair of resistors between said specimens, said resistors being connected together in two groups, each group comprising one of the resistors of each of said pairs of resistors, the resistors of each group being connected together in series with each other, said groups of series-connected resistors being connected in parallel with each other to a source of electrical energy, said resistors being arranged in said groups so that, with said surfaces at said different temperatures, each resistor of one group is at a different temperature from the resistor in the corresponding position in the other group, and means for indicating the values, relative to each other, of the potential differences between corresponding inter-resistor points in the separate groups of resistors.

4. Apparatus for determining the comparative thermal conductivities of specimens of two materials, comprising, in combination, means for providing two surfaces at different temperatures, a plurality of resistors having substantially equal values of resistance at the same temperature and having substantially equal temperature coefficients of resistance, said specimens and said resistors being adapted to be arranged between said two surfaces in heat-conductive contact with each other and said surfaces with one of said resistors in contact with one of said surfaces, another of said resistors in contact with the other of said surfaces and a third resistor between said specimens, means for causing current of substantially equal value to flow through each of said resistors, means for indicating the values, relative to each other, of the difference between the potential drops across the resistors adjacent to the opposite surfaces of one of said specimens and the difference between the potential drops across the resistors adjacent to the opposite surfaces of the other of said specimens.

5. Apparatus for determining the comparative thermal conductivities of specimens of two materials, comprising, in combination, means for providing surfaces at two different temperatures, a plurality of resistors having substantially equal values of resistance at the same temperature and having substantially equal temperature coefficients of resistance, said resistors being arranged in a plurality of units each comprising a pair of resistors, the resistors of each unit being so arranged that they are at substantially the same temperature, said specimens and said resistor units being adapted to be arranged between said surfaces at different temperatures in two stacks in heat-conductive contact with each other and said surfaces, each of said stacks comprising one specimen of each of said materials and a resistor unit between the two specimens, one of said stacks having a resistor unit between one of said surfaces and a specimen, the relative positions of said specimens of different material being reversed in the respective stacks, said resistors being electrically connected together in two groups, each group comprising one of the resistors of each of said units, the resistors of each group being connected together in series with each other, said groups of series-connected resistors being connected in parallel with each other to a source of electrical energy whereby each of said groups has one end thereof at a positive potential and the other end thereof at a negative potential, two of the resistors located adjacent to one of said surfaces being arranged one at one end position in one of said groups of resistors and the other at the other end position in the other of said groups of resistors, one of the resistors located between the specimens in one of the stacks being arranged at one of the remaining end positions in said groups of resistors, and one of the resistors located between the specimens in the other stack being arranged at the other remaining end position in said groups of resistors, and means for indicating the values, relative to each other, of the potential differences between corresponding inter-resistor points in the separate groups of resistors.

6. Apparatus for determining the comparative thermal conductivities of specimens of two materials, comprising, in combination, means for providing surfaces at two different temperatures, a plurality of resistors having substantially equal values of resistance at the same temperature and having substantially equal temperature coefficients of resistance, said resistors being arranged in a plurality of units each comprising a pair of resistors in such close proximity to each other that they are at substantially the same temperature, said specimens and said resistor units being adapted to be arranged between said surfaces at different temperatures in two stacks in heat-conductive contact with each other and said surfaces, each of said stacks comprising one specimen of each of said materials and a resistor unit between the two specimens, at least one of said stacks having a resistor unit between one of said surfaces and a specimen, the relative positions of said specimens of different material being reversed in the respective stacks, said resistors being electrically connected together in two groups, each group comprising one of the resistors of each of said units, the resistors of each group being connected together in series with each other, said groups of series-connected resistors being connected in parallel with each other to a source of electrical energy, said resistors being arranged electrically in said groups so that, with said surfaces at said different temperatures, the two resistors at corresponding end positions at one end of said groups are respectively at the temperatures existing at the opposite surfaces of a specimen of one material located in one stack, and the two resistors at corresponding end positions at the other end of said groups are respectively at the temperatures existing at the opposite surfaces of a specimen of the other material located in the second stack, and means for indicating the values, relative to each other, of the potential differences between corresponding end-most inter-resistor points in the separate groups of resistors.

7. Apparatus for determining the comparative thermal conductivities of specimens of two materials, comprising, in combination, means for providing surfaces at two different temperatures, a plurality of resistors having substantially equal values of resistance at the same temperature and having substantially equal temperature coefficients of resistance, said resistors being arranged in a plurality of units each comprising a pair of resistors in such close proximity to each other that they are at substantially the same temperature, said specimens and said resistor units being adapted to be arranged between said surfaces at different temperatures in two stacks in heat-conductive contact with each other and said surfaces, each of said stacks comprising one specimen of each of said materials and a resistor unit between the two specimens, at least one of said stacks having a resistor unit between one of said surfaces and a specimen, the relative positions of said specimens of different material being reversed in the respective stacks, said resistors being electrically connected together in two groups, each group comprising one of the resistors of each of said units, the resistors of each group being connected together in series with each other, said groups of series-connected resistors being connected in parallel with each other to a source of electrical energy, said resistors being arranged electrically in said groups so that, with said surfaces at said different temperatures, each resistor of one group is at a different temperature from the resistor in the corresponding position in the other group, and means for indicating the values, relative to each other, of the potential differences between corresponding inter-resistor points in the separate groups of resistors.

8. Apparatus for determining the comparative thermal conductivities of specimens of two materials, comprising, in combination, means for providing surfaces at two different temperatures, a plurality of resistors having substantially equal values of resistance at the same temperature and having substantially equal temperature coefficients of resistance, said specimens and said resistors being adapted to be arranged between said surfaces at different temperatures in two stacks in heat-conductive contact with each other and said surfaces, each of said stacks comprising one specimen of each of said materials and a resistor between the two specimens, at least one of said stacks having a resistor between a specimen and a surface at the same one of said two temperatures, the relative positions of said specimens of different material being reversed in the respective stacks, means for causing current of substantially equal value to flow through all of said resistors, means for indicating the values, relative to each other, of the difference between the potential drop across the resistor between the specimens in one of said stacks and the potential drop across a resistor between one of said surfaces and a specimen and the difference between the potential drop across the resistor between the specimens in the other stack and the potential drop across a resistor between one of said surfaces and a specimen.

9. Apparatus for determining the comparative thermal conductivities of specimens of two materials, comprising, in combination, means for providing surfaces at two different temperatures, a plurality of resistors having substantially equal values of resistance at the same temperature and having substantially equal temperature coefficients of resistance, said resistors being arranged in a plurality of units each comprising a pair of resistors, the resistors of each pair being so arranged that they are at substantially the same temperature, said specimens and said resistor units being adapted to be arranged between said surfaces at different temperatures in heat-conductive contact with one another and said surfaces with a resistor unit at the opposite surfaces of a specimen of each of said materials, said resistors being electrically connected together in two groups, each group comprising one of the resistors of each of said units, the resistors of each group being connected together in series with each other, said groups of series-connected resistors being connected in parallel with each other to a source of electrical energy, the two resistors arranged at corresponding end positions at one end of said groups being located respectively adjacent to opposite surfaces of a specimen of one of said materials, and the two resistors arranged at corresponding end positions at the other end of said groups being located respectively adjacent to opposite surfaces of a specimen of the other of said materials, and means for indicating the values, relative to each other, of the potential differences between corresponding end-most inter-resistor points in the separate groups of resistors.

10. Apparatus for determining the comparative thermal conductivities of specimens of two materials, comprising, in combination, means for providing two surfaces at different temperatures, a plurality of resistors having substantially equal values of resistance at the same temperature and having substantially equal temperature coefficients of resistance, said resistors being arranged in a plurality of units each comprising a pair of resistors, the resistors of each pair being so arranged that they are at substantially the same temperature, said specimens and said resistor units being adapted to be arranged between said two surfaces in heat-conductive contact with one another and at least one of said surfaces, said resistors being electrically connected together in groups, each group comprising one of the resistors of each of said units, the resistors of each group being connected together in series with each other, said groups of series-connected resistors being connected in parallel with each other to a source of electrical energy, said resistors being arranged electrically in said groups so that, with said surfaces at said different temperatures, each resistor of one group is at a different temperature from the resistor in the corresponding position in the other group, and means for indicating the values, relative to each other, of the potential differences between corresponding inter-resistor points in the separate groups of resistors.

11. Apparatus in accordance with claim 10, in which means are provided for equalizing the resistance from the source of electrical energy through a resistor to an inter-resistor point in one of said groups with the resistance from said source through a resistor to a corresponding inter-resistor point in the other of said groups when said resistors are at the same temperature.

12. Apparatus in accordance with claim 10, in which means are provided for resisting the loss of heat from the surfaces of said resistor units other than the surfaces which are in contact with the specimens and the surfaces at different temperatures.

13. Apparatus for determining the comparative thermal conductivities of specimens of two materials, comprising, in combination, means for providing two surfaces at different temperatures, a plurality of resistors having substantially equal values of resistance at the same temperature and having substantially equal temperature coefficients of resistance, said resistors being arranged in a plurality of units each comprising a pair of resistors, the resistors of each pair being so arranged that they are at substantially the same temperature, said specimens and said resistor units being adapted to be arranged between said two surfaces in heat-conductive contact with one another and at least one of said surfaces, said resistors being electrically connected together in two groups, each group comprising one of the resistors of each of said units, the resistors of each group being connected together in series with each other, said groups of series-connected resistors being connected in parallel with each other to a source of electrical energy, the resistors of each pair of resistors being located at different positions in the separate groups of resistors, and means for indicating the values, relative to each other, of the potential differences between corresponding inter-resistor points in the separate groups of resistors.

14. In apparatus for determining the thermal conductivity of materials, the combination of a plurality of resistors having substantially equal values of resistance at the same temperature and having substantially equal temperature coefficients of resistance, said resistors being arranged in a plurality of pairs, the resistors of each pair being so arranged that they are at substantially the same temperature, said resistors being electrically connected together in two groups, each group comprising one of the resistors of each of said pairs of resistors, the resistors of each group being connected together in series with each other, said groups of series-connected resistors being connected in parallel with each other to a source of electrical energy, the resistors of each pair of resistors being located at different positions in the separate groups of resistors, and means for indicating the values, relative to each other, of the potential differences between corresponding inter-resistor points in the separate groups of resistors.

15. In apparatus of the character described, a temperature responsive unit comprising a thin, flat, rigid, plate-form shell composed of a highly heat-conductive metal, said shell having a thin, flat cavity therein, and a pair of elongated resistors within said cavity, said resistors having substantially equal resistance at the same temperature and substantially equal temperature coefficients of resistance, and a pair of terminals for each of said resistors leading out of said shell.

JOSEPH RAZEK.

REFERENCES CITED

The following references are of record in the file of this patent:

UNITED STATES PATENTS

| Number | Name | Date |
|---|---|---|
| 1,044,270 | Shaler | Nov. 12, 1912 |
| 1,206,968 | Wilsey | Dec. 5, 1916 |
| 1,254,374 | Thomas | Jan. 22, 1918 |
| 1,411,396 | Wilson et al. | Apr. 4, 1922 |
| 1,652,917 | Umezawa | Dec. 13, 1927 |
| 1,822,022 | Gay | Sept. 8, 1931 |

FOREIGN PATENTS

| Number | Country | Date |
|---|---|---|
| 119,144 | Great Britain | Sept. 26, 1918 |
| 311,535 | Great Britain | May 16, 1929 |